United States Patent
Coster et al.

(10) Patent No.: US 10,027,542 B2
(45) Date of Patent: Jul. 17, 2018

(54) SKETCH BASED MONITORING OF A COMMUNICATION NETWORK

(71) Applicant: Telefonaktiebolaget L M Ericsson (publ), Stockholm (SE)

(72) Inventors: Rickard Coster, Hagersten (SE); Vincent Huang, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 314 days.

(21) Appl. No.: 14/565,494

(22) Filed: Dec. 10, 2014

(65) Prior Publication Data

US 2015/0163104 A1    Jun. 11, 2015

(30) Foreign Application Priority Data

Dec. 11, 2013  (EP) .................................... 13196636

(51) Int. Cl.
| | | |
|---|---|---|
| *G06F 15/173* | (2006.01) | |
| *H04L 12/24* | (2006.01) | |
| *H04L 12/26* | (2006.01) | |

(52) U.S. Cl.
CPC .......... *H04L 41/0816* (2013.01); *H04L 43/02* (2013.01); *H04L 43/08* (2013.01); *H04L 41/0893* (2013.01)

(58) Field of Classification Search
CPC . H04L 41/0816; H04L 41/0893; H04L 43/02; H04L 43/08
USPC .......................................................... 709/224
See application file for complete search history.

(56) References Cited

U.S. PATENT DOCUMENTS

| | | | | |
|---|---|---|---|---|
| 8,738,036 | B1* | 5/2014 | Boyle | H04W 4/023 455/456.1 |
| 2007/0074114 | A1* | 3/2007 | Adjali | G06F 3/01 715/706 |
| 2009/0003279 | A1* | 1/2009 | Abusch-Magder | H04W 36/0083 370/331 |
| 2011/0045820 | A1* | 2/2011 | Huber | H04L 41/0659 455/424 |
| 2011/0255424 | A1* | 10/2011 | Nelson | H04L 43/18 370/252 |
| 2012/0207046 | A1* | 8/2012 | Di Pietro | H04L 41/16 370/252 |
| 2013/0072145 | A1* | 3/2013 | Dantu | H04M 11/04 455/404.1 |

(Continued)

OTHER PUBLICATIONS

Cormode, G., et al., "An Improved Data Stream Summary: The Count-Min Sketch and its Applications", Center for Discrete Mathematics and Computer Science (DIMACS), Rutgers University, Dec. 16, 2003, 18 pages.

(Continued)

*Primary Examiner* — Tauqir Hussain
(74) *Attorney, Agent, or Firm* — Sage Patent Group

(57) ABSTRACT

A node of a communication network determines a hash-based sketch. The sketch may for example correspond to a Count-Min (CM) sketch. The sketch summarizes a number of occurrence of an event for a group of UEs. Further, the node receives information representing the number of occurrence of the event for said group of UEs from one or more further nodes of the communication network, e.g., in a further hash-based sketch. The node updates the sketch with the information received from the further and provides the updated sketch to the further nodes.

15 Claims, 6 Drawing Sheets

(56) References Cited

U.S. PATENT DOCUMENTS

2015/0173037 A1\* 6/2015 Pijl ...................... A61B 5/1117
455/456.1

OTHER PUBLICATIONS

Aggarwal, C., et al., "A Survey of Synopsis Construction in Data Streams", IBM T.J. Watson Research Center, Hawthorne, NY, 2007, pp. 169-207.
Metwally, A., et al., "Efficient Computation of Frequent and Top-k Elements in Data Streams", Department of Computer Science, University of California, Santa Barbara, 2005, pp. 398-412.

\* cited by examiner

SKETCH BASED MONITORING OF A COMMUNICATION NETWORK

CROSS-REFERENCE TO RELATED APPLICATIONS

This application claims priority to European Application No. 13196636/.8, filed on Dec. 11, 2013, which is incorporated by reference herein.

TECHNICAL FIELD

The present invention relates to methods for monitoring a communication network and to corresponding devices.

BACKGROUND

In communication networks, e.g., a cellular network as specified by 3GPP ($3^{rd}$ Generation Partnership Project), it is known to implement monitoring functionalities, e.g., for supporting management and maintenance of the communication network. In order to allow comprehensive monitoring, a various kinds of nodes of the communication network may be involved in the monitoring.

However, certain nodes of a communication network, such as a base station of a cellular network, may have only limited computing resources. For example, the computing resources may be limited by the capabilities of a CPU (Central Processing Unit), RAM (Random Access Memory), or non-volatile storage capacity of such node. Accordingly, it is problematic to implement such nodes with monitoring functionalities which require a significant amount of computing resources, such as statistical analysis. For example, such statistical analysis could be based on monitored events related to a user equipment (UE).

Further, in cellular network scenarios implementation of statistical analysis in a given node may be complex due to mobility of UEs. For example, some events related to a certain UE may occur at one node, whereas other events of the same type occur at another node, because the UE has moved from one cell to another cell of the cellular network. In such cases, recording a statistic which is based on the event may require collecting information from multiple nodes. Therefore, such statistics would normally be generated at centralized nodes. However, for some applications, it may also be desirable to have such statistic available not only in centralized nodes, but for example also in the nodes to which the monitored events relate, including not only the nodes at which the events occurred in the past. In other words, if a UE is in the service area of a given node, for the statistic not only the events which occurred at this node may be relevant, but also the events which occurred while the UE was in the service area of other nodes.

A known approach to address the above issue is to maintain the statistic at a centralized node and to provide it to other nodes upon request, e.g., as in the reporting mechanisms of the Policy and Charging Control (PCC) architecture defined in 3GPP TS 23.203 V12.2.0 (2013-September). However, this typically means that the statistic is not immediately available at such other nodes if needed, which is not acceptable in some cases. For example, a base station may need to optimize its performance with respect to a certain UE and therefore request the statistic from the centralized node. However, when the statistic becomes available at the base station, the UE may already have left the service area of the base station.

Further, some statistics may be based on events related to multiple UEs, which further complicates handling of the statistics.

Accordingly, there is a need for techniques which allow for efficiently monitoring a communication network.

SUMMARY

According to an embodiment of the invention, a method for monitoring a communication network is provided. According to the method, a node of the communication network determines a hash-based sketch. The sketch may for example correspond to a Count-Min (CM) sketch. However, other types of hash-based sketches could be used as well. The sketch summarizes a number of occurrence of an event for a group of UEs. Further, the node receives information representing the number of occurrence of the event for said group of UEs from at least one further node of the communication network. In typical scenarios, the information representing the number of occurrence of the event may be received from a plurality of further nodes of the communication network. The node updates the sketch with the information received from the at least one further node. Further, the node provides the updated sketch to the at least one further node.

The information received from the at least one further node may comprise a further hash-based sketch summarizing the number of occurrence of the event for said group of UEs. In this case, the node may update the sketch by merging the further sketch to the sketch.

Alternatively, the information received from the at least one further node may comprise occurrence data for a specific UE from said group of UEs, the occurrence data indicating the number of occurrence of the event for the specific UE. For example, the occurrence data may comprise a count number, e.g., obtained by counting detections of the event. Alternatively or in addition, the occurrence data may comprise a rate, e.g., obtained by measuring the rate of detecting the event. Alternatively or in addition, the occurrence data may comprise timing information related to the event, e.g., obtained by measuring a time interval between detections of the event.

In scenarios where the information received from the at least one further node comprises occurrence data for a specific UE, the node may update the sketch by encoding the occurrence data into the sketch, using an identifier of the specific UE as a key. The identifier may for example comprise an International Mobile Subscriber Identity (IMSI), a Temporary Mobile Subscriber Identity (TMSI), an International Mobile Equipment Identity (IMEI), and/or a Uniform Resource Identifier (URI) assigned to the specific UE.

Based on the updated sketch, the node may control communication of at least one UE from said group of UEs, e.g., by prioritizing the UE or a service used by the UE. Alternatively or in addition, the node may use the updated sketch as a basis for providing information to an operations support system (OSS) of the communication network.

According to a further embodiment of the invention, a method is provided. According to the method, a node of the communication network receives a hash-based sketch from a further node of the communication network. The sketch may for example correspond to a CM sketch. The hash-based sketch summarizes the number of occurrence of an event for a group of UEs. Further, the node obtains occurrence data for a specific UE from said group of UEs. The occurrence data indicate the number of occurrence of the event for the specific UE. For example, the node may obtain the occurrence data by performing measurements or by processing measurements performed by other nodes of the communication network. The occurrence data may for example comprise a count number, e.g., obtained by counting detections of the event. Alternatively or in addition, the occurrence data may comprise a rate, e.g., obtained by measuring the rate of detecting the event. Alternatively or in addition, the occurrence data may comprise timing information related to the event, e.g., obtained by measuring a time interval between detections of the event. Further, the node updates the sketch with the obtained occurrence data. Further, the node provides the updated sketch to the further node.

The node may update the sketch by encoding the occurrence data into the sketch, using an identifier of the specific UE as a key. The identifier may for example comprise an IMSI, a TMSI, an IMEI, and/or a URI assigned to the specific UE.

Based on the updated sketch the node may control communication of at least one UE from said group of UEs, e.g., by prioritizing traffic of the UE or a specific service used by the UE. Alternatively or in addition, the node may use the updated sketch as a basis for providing information to an OSS of the communication network.

According to a further embodiment of the invention, a node for a communication network is provided. The node comprises at least one interface to at least one further node of the communication network. Further, the node comprises at least one processor. The at least one processor is configured to determine a hash-based sketch. The sketch may for example correspond to a CM sketch. The sketch summarizes a number of occurrence of an event for a group of UEs Further, the at least one processor is configured to receive information representing the number of occurrence of the event for the group of UEs from the at least one further node of the communication network. Further, the at least one processor is configured to update the sketch with the information received from the at least one further node. Further, the at least one processor is configured to indicate the updated sketch to the at least one further node.

The information received from the at least one further node may comprise a further hash-based sketch summarizing the number of occurrence of the event for said group of UEs. In this case, the at least one processor may be configured to update the sketch by merging the further sketch to the sketch.

Alternatively, the information received from the at least one further node may comprise occurrence data for a specific UE from said group of UEs, the occurrence data indicating the number of occurrence of the event for the specific UE. For example, the occurrence data may comprise a count number, e.g., obtained by counting detections of the event. Alternatively or in addition, the occurrence data may comprise a rate, e.g., obtained by measuring the rate of detecting the event. Alternatively or in addition, the occurrence data may comprise timing information related to the event, e.g., obtained by measuring a time interval between detections of the event.

In scenarios where the information received from the at least one further node comprises occurrence data for a specific UE, the at least one processor may be configured to update the sketch by encoding the occurrence data into the sketch, using an identifier of the specific UE as a key. The identifier may for example comprise an IMSI, a TMSI, an IMEI, and/or a URI assigned to the specific UE.

According to an embodiment, the at least one processor may be configured to control communication of at least one UE from the group based on the updated sketch, e.g., by prioritizing the UE or a service used by the UE. Alternatively or in addition, the at least one processor may be configured to use the updated sketch as a basis for providing information to an OSS of the communication network.

According to a further embodiment of the invention, a node for a communication network is provided. The node comprises an interface to a further node of the communication network. Further, the node comprises at least one processor. The at least one processor is configured to receive a hash-based sketch from the further node of the communication network. The sketch may for example correspond to a CM sketch. The sketch summarizes a number of occurrence of an event for a group of UEs. Further, the at least one processor is configured to obtain occurrence data for a specific UE from the group of UEs. The occurrence data indicate the number of occurrence of the event for the specific UE. Further, the at least one processor is configured to update the sketch with the obtained occurrence data. Further, the at least one processor is configured to indicate the updated sketch to the further node.

According to an embodiment, the at least one processor may be configured to obtain the occurrence data by performing measurements or by processing measurements performed by other nodes of the communication network. The occurrence data may for example comprise a count number, e.g., obtained by counting detections of the event. Alternatively or in addition, the occurrence data may comprise a rate, e.g., obtained by measuring the rate of detecting the event. Alternatively or in addition, the occurrence data may comprise timing information related to the event, e.g., obtained by measuring a time interval between detections of the event.

According to an embodiment, the at least one processor is configured to update the sketch by encoding the occurrence data into the sketch, using an identifier of the specific UE as a key. The identifier may for example comprise an IMSI, a TMSI, an IMEI, and/or a URI assigned to the specific UE.

According to an embodiment, the at least one processor is configured to control communication of at least one UE from the group based on the updated sketch, e.g., by prioritizing the UE or a service used by the UE. Alternatively or in addition, the at least one processor may be configured to use the updated sketch as a basis for providing information to an OSS of the communication network.

According to a further embodiment of the invention, a computer program or computer program product comprising program code to be executed by at least one processor of a node for a communication network is provided, e.g., in the form of a non-transitory storage medium. Execution of the program code causes the at least one processor to determine a hash-based sketch. The sketch may for example correspond to a CM sketch. The sketch summarizes a number of occurrence of an event for a group of UEs Further, execution of the program code causes the at least one processor to receive information representing the number of occurrence of the event for the group of UEs from at least one further node of the communication network. Further, execution of the program code causes the at least one processor to update the sketch with the information received from the at least one further node. Further, execution of the program code causes the at least one processor to indicate the updated sketch to the at least one further node.

According to a further embodiment of the invention, a computer program or computer program product comprising program code to be executed by at least one processor of a node for a communication network is provided, e.g., in the form of a non-transitory storage medium. Execution of the program code causes the at least one processor to receive a hash-based sketch from the further node of the communication network. The sketch may for example correspond to a CM sketch. The sketch summarizes a number of occurrence of an event for a group of UEs. Further, execution of the program code causes the at least one processor to obtain occurrence data for a specific UE from the group of UEs. The occurrence data indicate the number of occurrence of the event for the specific UE. Further, execution of the program code causes the at least one processor to update the sketch with the obtained occurrence data. Further, execution of the program code causes the at least one processor to indicate the updated sketch to the further node.

DETAILED DESCRIPTION OF EMBODIMENTS

In the following, concepts according to embodiments of the invention will be explained in more detail by referring to the accompanying drawings. The illustrated concepts relate to monitoring of a communication network, in particular a cellular communication network, e.g., as specified by 3GPP. The communication network may support various radio access technologies, e.g., GSM (Global System for Mobile communication), UMTS (Universal Terrestrial Mobile Telecommunications System) or Wideband CDMA (Code Division Multiple Access), CDMA2000, WiMaX, or LTE (Long Term Evolution). However, it is to be understood that the illustrated concepts could also be applied to other kinds of communication networks, e.g., using wire based access technologies such as Digital Subscriber Line (DSL), coaxial cable, or optical fibre, or Internet Protocol (IP) based local area networks (LANs) or wide area networks (WANs).

Figure 1:
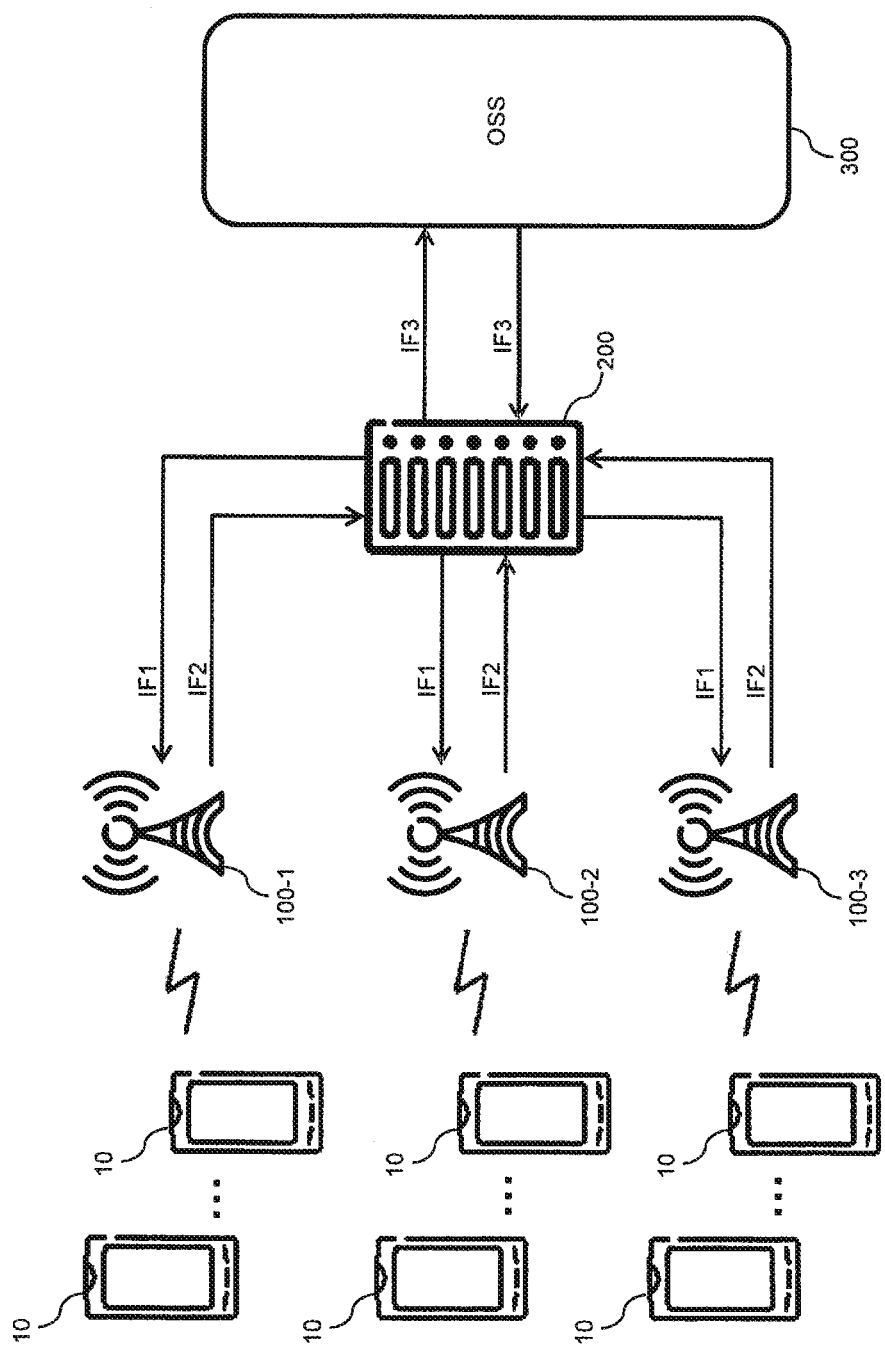
FIG. 1 schematically illustrates an exemplary communication network in which sketch based monitoring may is applied.

FIG. 1 schematically illustrates structures of the communication network. Specifically, FIG. 1 shows different nodes of the communication network, exemplified by bases stations 100-1, 100-2, 100-3 and a central node 200, e.g., a centralized control node, such as a Mobility Management Entity (MME) of the LTE radio access technology, a gateway, such as a Packet Data Network Gateway (PGW) of the Evolved Packet Core (EPC) specified for the LTE radio access technology, or in a proxy node. Further, the central node 200 could also be dedicated for the purpose of collecting statistics. In addition, FIG. 1 illustrates an OSS 300 of the communication network, which for example provides functionalities for management, maintenance or optimization of the communication network. The base stations 100-1, 100-2, 100-3 are distributed in an overall service area of the communication network. The communication network may also include other types of nodes which are distributed in the overall service area of the communication network, e.g., local control nodes or local gateways. In the following explanations, such nodes which of which multiples instances are distributed in the overall service area of the communication network will also be referred to as local nodes. Such local nodes typically have their own local service area within the communication network.

Further, FIG. 1 illustrates a group of UEs 10 which may connect to the communication network via the base stations 100-1, 100-2, 100-3 using radio links. The UEs may for example correspond to mobile phones, portable computer systems, stationary computer systems, or the like. As a general rule, the UEs 10 are assumed to be mobile within the communication network. That is to say, the UEs 10 may connect to the communication network via any of the base stations 100-1, 100-2, 100-3 and move between the base stations 100-1, 100-2, 100-3. Further, it is assumed that while a specific UE 10 is connected to the communication network via one of the base stations 100-1, 100-2, 100-3, certain control functionalities with respect to the specific UE 10 are handled locally by this base station 100-1, 100-2, 100-3.

For some applications, it is desirable to make a certain statistic concerning the different UEs available not only in the central node 200, but also in the different local nodes. For example, in the scenario of FIG. 1, the base stations 100-1, 100-2, 100-3 may be provided with functionalities for prioritizing or optimizing communication of UEs 10 or services used by the UEs 10, and this functionality may utilize the statistic. For example, the statistic could reflect an average traffic volume, e.g., in terms of sent and/or received bytes or data packets, an average number of connections created, an average number of utilized bearers, an average number of used applications, an average number of dropped data packets, an average packet inter-arrival time, various kinds of histograms, or the like. The central node 200 may use the statistic for similar purposes. Further, the central node 200 may utilize the statistic for providing information to the OSS 300, which may then use the statistic for management, maintenance or optimization purposes.

According to the illustrated concepts, such kind of statistic may be provided in an efficient manner by utilizing a hash-based sketch for summarizing the number of occurrence of an event related to the group of UEs 10. The sketch may be stored and updated locally in the local nodes 100-1, 100-2, 100-3 and in the central node 200. The central node 200 may further act to distribute updated versions of the sketch to the local nodes 100-1, 100-2, 100-3.

By means of the sketch, it becomes possible to make summarized occurrence data concerning the event available at the different nodes, without requiring that each individual occurrence of the event is communicated to the different nodes. Further, occurrence data concerning a specific UE 10 can efficiently be made available at given local node 100-1, 100-2, 100-3 even before this specific UE 10 has entered the local service area of this local node 100-1, 100-2, 100-3.

The sketch which is utilized in the illustrated concepts may for example be a CM sketch or a variant thereof, e.g., as described in "An improved data stream summary: the count-min sketch and its applications" by G. Cormode and S. Muthukrishna, Journal of Algorithms, 55(1), pp. 58-75 (2005), in "A survey of synopsis construction in data streams" by C. C. Aggarwal, and S. Y. Philip, In Data Streams, pp. 169-207, Springer U.S. (2007), or in "Efficient computation of frequent and top-k elements in data streams" by A. Metwally, D. Agrawal, and A. El Abbadi, In Database Theory-ICDT 2005, pp. 398-412, Springer Berlin Heidelberg (2005).

As explained in the above publications, a hash-based sketch may be used to track the approximate frequency or number of occurrence for a certain quantity and for a large number of items. In the concepts as described herein, the sketch is used to represent the approximate number of occurrence for an event related to the group of UEs 10. By further analysis, the sketch may also be used to quickly find heavy hitters, do temporal analysis, derive moments, estimate join sizes, or the like. As a matter of course, the concepts may also be used with respect to a number of different events, by defining a corresponding sketch for each event.

Depending on the type of the observed event, the sketch can be used as a basis for generating various kinds of statistics relating to a specific UE or to a larger number of UEs. For example, such statistic may concern a traffic volume, e.g., in terms of a number of sent and/or received bytes or data packets, a number of created connections, a number of utilized bearers, a number of used applications, a number of dropped packets, inter arrival times of data packets. Still further, the sketch may be used as a basis for various sorts of histograms. The sketch can be reset to zero at any time in order to obtain occurrence data during a specified time window.

Figure 2:
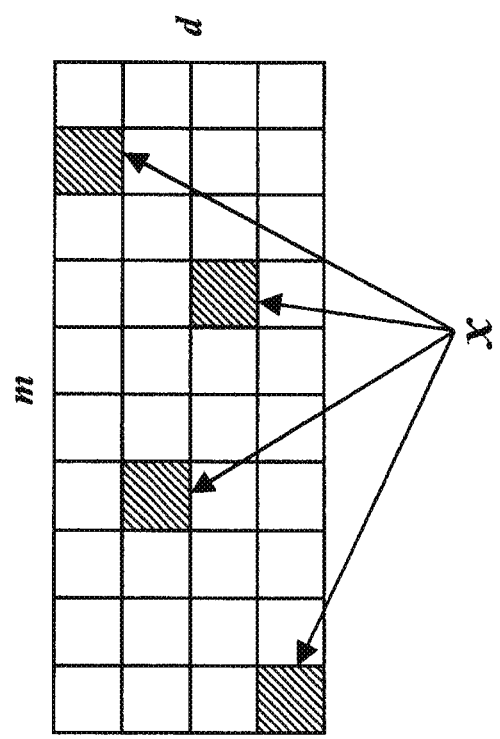
FIG. 2 illustrates an exemplary CM sketch as used in an embodiment of the invention.

FIG. 2 schematically illustrates an exemplary CM sketch as used in an implementation of the illustrated concepts.

As can be seen, the CM sketch may be represented by a matrix M of m columns and d rows, indentified by row indices i=0,1, . . . , d. Associated with each row i is a hash function $h_i$. The size of the matrix M, i.e., the values of m and d, may be selected depending on storage space requirements and desired accuracy of representing the number of occurrence (or tolerable losses when summarizing the number of occurrence for the group of UEs).

When occurrence of the event is newly detected for the UE x, i.e., the number of occurrence increases by one, the sketch is updated by incrementing one cell in each row, according to:

$$M[i,h_i(x)]:=M[i,h_i(x)]+1, \text{ with } i=0,1,\ldots d. \quad (1)$$

The current estimate for the occurrence number for the UE x is thus distributed over all rows, and may overlap with other items that give the same hash value. In order to retrieve the estimate of the number of occurrence for the UE x, the cells of the matrix identified by the hash function of the UE may be evaluated to identify the minimum value. That is to say, the current estimate for the number of occurrence for the UE x may be obtained according to:

$$E_x=\min(M[0,h_0(x)],M[1,h_1(x)], \ldots, M[d, h_d(x)]). \quad (2)$$

The above operations according to relations (1) and (2) may of course vary depending on the specific type of hash-based sketch which is used for summarizing the number of occurrence. Still further, it is to be understood that the update of the sketch according to relation (1) may also be adapted to consider other kinds of newly available occurrence data. For example, if the event was multiply detected, the values of the cells may be incremented by a corresponding larger value.

As mentioned above, the sketch is maintained by both the local nodes 100-1, 100-2, 100-3 and the central node 200. In some implementations, the sketch may be configured to be maintained by all the local nodes of the communication network. In other implementations, the sketch may also be configured to be maintained by some of the local nodes of the communication network covering a certain region within the overall service area of the communication network. The latter option may be used to avoid an excessively large size of the sketch. For example, if the sketch is maintained by a group of about a few hundred local nodes, handling of the sketch may be facilitated as compared to a scenario where the sketch is maintained by ten thousands of local nodes, which may for example correspond to the overall number of base stations in the communication network. It may therefore be advantageous to define suitable aggregation areas in the communication network in which the local nodes maintain the same area sketch. The different area sketches may for example differ with respect to the group of UEs considered in the sketch. However, such different groups of UEs may also overlap. The central node may then for example be responsible for combining the information from different area sketches and updating the area sketches accordingly. For this purpose, the central node may maintain a master sketch which combines the information from all area sketches, i.e., which relates to the unification of the different groups of UEs considered by the area sketches.

Accordingly, in some implementations the updating of sketches may be organized in different levels: On a regional level, the local nodes of a certain aggregation area maintain an area sketch and update the area sketch on the basis of newly obtained occurrence data. An updated version of the area sketch is then provided by each local node of the aggregation area to the central node. The central node then obtains a further updated version of the area sketch by merging the versions received from the local nodes. Further, the central node may also consider information from other area sketches when providing the updated version, e.g., if the other area sketches have an overlap in the considered group of UEs. The central node may then provide this updated version to the local nodes. On a global level, the central node may also consider the information from other area sketches. For this purpose, the central node may update the master sketch with the information from the different area sketches from the different aggregation areas. The central node may also provide the master sketch to the local nodes of the different aggregation areas. The area sketches and/or the master sketch may be used by the local nodes and the central node for controlling communication of the UEs or providing information to the OSS.

As mentioned above, for updating the sketch with newly obtained occurrence data, a hash function is associated with each row of the matrix representing the sketch. The hash functions are selected to be pair-wise independent. In the illustrated concepts, this hash function may be obtained by specifying a certain hash-algorithm, e.g., a secure hash algorithm (SHA), and using an identifier of the specific UE as the hash key for this algorithm. In this way, the hash function can be individualized for each UE of the group. In this connection, various kinds of identifiers may be used as the hash key, e.g., an IMSI, a TMSI, an IMEI, or a URI. Utilizing an identifier which is unique over the entire communication network, e.g., the IMSI or IMEI, has the advantage that the specific UE can be identified from the area sketch or master sketch in any region of the communication network. When using an identifier for which uniqueness can be ensured only regionally or temporarily, additional processes may be implemented for associating the different identifiers of the same specific UE to each other.

In the following, the handling of sketches according to an exemplary implementation will be further explained by referring to the exemplary scenario of FIG. 1, assuming that the base stations 100-1, 100-2, 100-3 represent local nodes of the same aggregation area. As illustrated, exchange of information between the local nodes 100-1, 100-2, 100-3, the central server 200, and the OSS 300 may then be accomplished using a downlink interface between each local node 100-1, 100-2, 100-3 and the central node 200, referred to as IF1, an uplink interface between each local node 100-1, 100-2, 100-3 and the central node 200, referred to as IF2, and a bi-directional interface between the central node 200 and the OSS 300, referred to as IF3.

Initially, the OSS 300 may use the interface IF3 to configure the central node 200 and the local nodes 100-1, 100-2, 100-3 with respect to the sketch based monitoring. For example this may include defining the types of sketch (es) to be used and the measurements and data collections to be performed for maintaining the sketch(es). Further, this may include specifying which nodes should maintain the sketch. In some cases, the OSS 300 may also configure which nodes should maintain an area sketch and which node should maintain the master sketch.

The central node 200 may then use the interface IF1 for providing the area sketch to the local nodes 100-1, 100-2, 100-3. This may include indicating the sketch matrix M, the hash function definitions (also referred to as seeds), and information specifying which kind of occurrence data is to be collected into the sketch.

Each of the local nodes 100-1, 100-2, 100-3 may then individually perform measurements to obtain the occurrence data to be collected and update the sketch with the occurrence data. Using the interface IF2, each of the local nodes 100-1, 100-2, 100-3 may then provide its updated version of the sketch to the central node 200. For example, this may be accomplished in response to a request from the central node 200 or on the basis of a regular time schedule. Still further, it is possible to specify triggering criteria for the provision of the updated version of the sketch to the central node 200.

The central node 200 may then provide a further updated version of the sketch by merging the different versions of the sketch from the local nodes 100-1, 100-2, 100-3. This merging operation may for example involve summation of the respective matrices.

Having performed the update, the central node 200 may provide its updated version of the sketch to the local nodes 100-1, 100-2, 100-3, which then use this updated version as the basis for continuing with their individual local update operations as explained above. This process of locally updating the sketch by the local nodes 100-1, 100-2, 100-3, providing the updated sketch to the central node 200, updating of the sketch at the central node 200, and providing the updated sketch to the local nodes 100-1, 100-2, 100-3 may be iterated continuously, thereby collecting occurrence data from all the local nodes 100-1, 100-2, 100-3 into the sketch.

In some cases, the central node 200 may use the interface IF1 for resetting the sketch maintained at the local nodes 100-1, 100-2, 100-3, e.g., by setting all cells in the matrix to zero.

In some implementations, it is also possible to use compression for the transmission of the sketches over the interfaces IF1 and IF2. Usage of compression may for example be indicated by a flag in a message header used for transmission of the sketch. Further, the transmission of sketches over the interfaces IF1 and IF2 may be supplemented with additional information, for example, such additional information could indicate the collection period, e.g., in terms of duration, starting time, or end time. Further, such additional information could indicate the number of UEs 10 considered in the update, the number of considered events, or the like.

In some implementations, the interface IF2 could also be used for sending collected occurrence data from the local nodes 100-1, 100-2, 100-3 to the central node 200, and the updating of the sketch with the occurrence data could be accomplished by the central node 200.

For explanation of a further implementation, it may also be assumed that the local nodes 100-1, 100-2, 100-3 belong to different aggregation areas using different area sketches. For example, the local nodes 100-1 and 100-2 could belong to one aggregation area for which a first area sketch is defined, and the local node 100-3 could belong to another aggregation area for which a second area sketch is defined. The first and second area sketches may represent the number of occurrence of the considered event for a first and second group of the UE 10, respectively. The first and second group may differ with respect to their group members. That is to say, one or more of the UEs 10 may be member of the first group, but not of the second, and/or one or more of the UEs 10 may be member of the second group, but not of the first group. However, in the considered exemplary scenario, also some overlap between the first and second group is assumed, i.e., one or more of the UEs 10 are assumed to be member of both the first and the second group. Still further, the first and second group may also differ with respect to their size, and also the sizes of the first and second area sketches may be different.

With respect to the area sketches, the local nodes 100-1, 100-2, 100-3 of each aggregation area and the central node 200 may operate as explained above, i.e., locally update the sketch by the local nodes 100-1, 100-2, 100-3 of the respective aggregation area, provide the updated area sketch to the central node 200, which then updates the area sketch by merging with other versions of the area sketch, and provide the updated area sketch to the local nodes 100-1, 100-2, 100-3 of the aggregation area.

Further, to combine information from the different area sketches in this implementation, the central node 200 also obtains a master sketch. The master sketch relates to a group of the UEs 10 which corresponds to the unification of the first and second groups. Accordingly, also the matrix M representing the master sketch may have a larger number of rows than the different area sketches. The master sketch combines the information from the different area sketches. For this purpose, the collected occurrence data for each specific UE 10 may be read from the area sketches and then written into the master sketch, using relation (1). In some implementations, the area sketches may be based on other identifiers of the UEs 10 than the master sketch. For example, the master sketch could be based on identifiers which are globally unique in the whole communication network, such as on IMSIs or IMEIs, whereas the area sketches could be based on identifiers which are unique only with the given aggregation area or which are only temporarily unique. In such cases, the central node 200 may also accomplish mapping of the different identifiers to each other.

Further, for the UEs 10 which are members of both the first and second group, the central node 200 may use the collected occurrence data from the first area sketch to update the second area sketch, using relation (1), and may use the collected occurrence data from the second area sketch to updated the first area sketch, using relation (1). If the identifiers used for these overlapping UEs 10 differ between the first and second group, the central node 200 may also accomplish mapping of the different identifiers to each other. Accordingly, the central node 200 may also provide for exchange of information between the different aggregation areas, while at the same time maintaining a limited size of the sketches for the different aggregation areas.

In any of the above implementations, the central node 200 may also use the interface IF3 for providing information from the sketch to the OSS 300. The OSS 300 may then use this information for optimization, maintenance, or management purposes. Still further, each of the local nodes 100-1, 100-2, 100-3 or the central node 200 may use the sketch for control purposes, e.g., for prioritizing one or more of the UEs 10 or one or more services used by the UEs 10, or for optimizing performance for one or more of the UEs 10.

In some implementations, the local nodes 100-1, 100-2, 100-3 which participate in the updating of the sketch may be dynamically selected. For example, the sketch could be updated only by those local nodes 100-1, 100-2, 100-3 which are associated with a current active set of cells for a given UE 10. This may require adding a certain UE 10 to the sketch or removal of a certain UE 10 from the sketch.

To add a new UE 10 to the sketch, first the currently applicable occurrence data for the UE 10 is obtained, e.g., from the master sketch, and represented as a vector $C_i$. Then the occurrence data $C_i$ may be added to the matrix according to:

$$M[i,h_i(x)] =: M[i,h_i(x)] + C_i, \text{ with } i=0,1,\ldots, d. \quad (3)$$

Similarly, a specific UE 10 may be removed from the sketch by subtracting the vector $C_i$ from the sketch according to:

$$M[i,h_i(x)] =: M[i,h_i(x)] - C_i, \text{ with } i=0,1,\ldots d. \quad (4)$$

In some implementations, the sketch may also be used for obtaining a time-series statistic. For this purpose, the sketch may be stored as a function of time, e.g., for a certain observation window. This may be accomplished at the local nodes 100-1, 100-2, 100-3 and/or at the central node 200. By choosing different update frequencies between the local nodes 100-1, 100-2, 100-3, different time-resolutions can be obtained. For example, the local nodes 100-1, 100-2, 100-3 could update the sketch every second, and the central node 200 could update the sketch every minute.

The sketches as obtained in the above implementations may be used for various purposes. For example, the sketches may be used to provide a statistic on a UE level, e.g., by considering the collected occurrence data for a specific UE. Further, the sketches may be used for providing a statistic on a service or service class level, e.g., by considering the collected occurrence data for the UEs using the service or service class. Still further, the sketch may be used for providing a statistic on a node level, e.g., by considering the collected occurrence data for the UEs in the service area of this node.

A statistic on the UE level may for example be used to adapt radio access parameters to current or predicted future characteristics of the specific UE. One example is optimization of Discontinuous Reception (DRX) as specified for the LTE radio access technology. In this case, the optimization could be based on a statistic evaluation of inter arrival times of data packets for the specific UE. The inter arrival times may then be first assigned to different time bins, e.g., a time bin corresponding to an inter arrival time of 0 to 10 ms, a further time bin corresponding to an inter arrival time of 10 to 20 ms, and so on. Each time bin corresponds to a counter, and the counter values may be collected in corresponding sketches. That is to say, a corresponding sketch may be defined for each time bin. The statistic may then be used to adjust DRX parameters for the UE, thereby allowing for reducing battery consumption of the the UE. Since the sketches can be made available in different base stations, to the service areas of which the UE may move, the adjustment can be made quickly whenever the UE moves between cells.

Another exemplary usage of a statistic on the UE level is control of pre-scheduling as specified for the LTE radio access technology. In the case of pre-scheduling, uplink grants are provided to the UE already before the UE has requested allocation of uplink radio resources. The UE thus already has an uplink grant when it needs to send uplink data, thereby avoiding additional latency due to requesting the uplink grant, which can be up to 10 ms. On the other hand, excessive pre-scheduling may waste resources if the pre-scheduled uplink grants are not needed by the UE. Accordingly, it is desirable to perform the pre-scheduling in such a way that uplink grants are provided to the UE according to an accurate estimate for the current requirements of the UE. This estimate may be obtained from similar sketches as explained above for the DRX case.

Another exemplary usage of a statistic on the UE level is control of bearers or QoS parameters. For example, the specific UE enters a new cell, e.g., in the course of a handover, the node associated with the new cell may have only little information on the UE. On the other hand, certain control operations with respect to the UE need to be performed by the node, such as setup of a Radio Access Bearer (RAB). A RAB is configured with a number of parameters, such as Quality of Service Class Identifier (QCI), Allocation and Retention Priority (ARP), Guaranteed Bit Rate (GBR), and Aggregate Maximum Bit Rate (AMBR), or the like. Using the sketches, a suitable configuration of these parameters may be selected. For example, the sketches could collect information with respect to the type of used applications or services, and/or with respect to average traffic volumes for this UE.

The above usages of a statistic on the UE level may also be applied in a corresponding manner with a statistic on the service or service class level, by subjecting the UEs using a certain service or service class to the same treatment. For example, these UEs could be identified by a common Quality of Service Class identifier (QCI). In this case, the DRX parameters, pre-scheduling, or RAB setup may be controlled in the same way for multiple UEs, using the service or service class level statistic.

An exemplary usage of a statistic on the node level is to provide performance information, e.g., cell trace events, to the OSS 300 and optionally also from the OSS 300 further to a Network Management System (NMS), e.g., using the Itf-N interface as for example specified in 3GPP TS 32.102 V11.2 (2013-September). The performance information may be used by the OSS 300 and/or by the NMS for optimization of the node or of the communication network infrastructure in the region of the node. Such optimizations may involve reconfiguration of the node, replacement of the node, adding further nodes to the communication network infrastructure, or the like. In such cases it is also possible that the OSS 300 generates an aggregated sketch from the information provides by the OSS 300 and propagates the aggregated sketch to the NMS. Accordingly, also the OSS 300 may perform similar functionalities as the central node 200.

Figure 3:
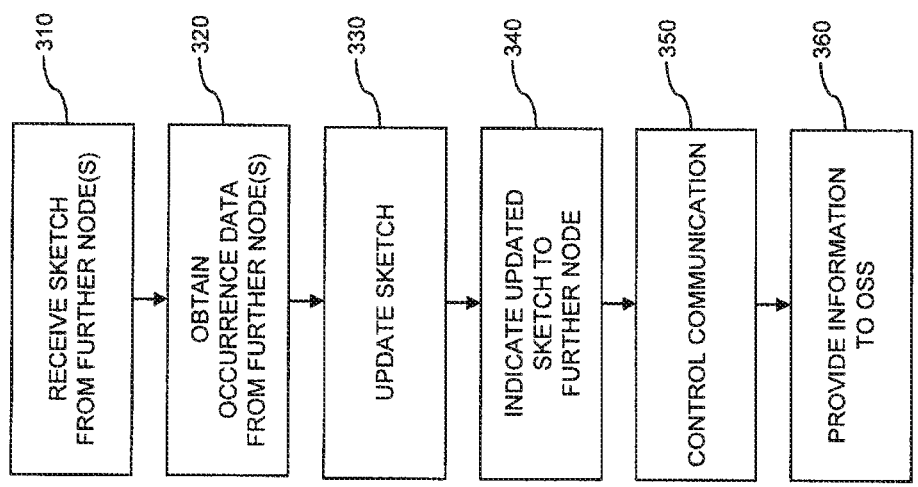
FIG. 3 shows a flowchart for illustrating a method according to an embodiment of the invention, which may be implemented by a central node which distributes updated sketches to local nodes.

FIG. 3 shows a flowchart for illustrating a method which may be used for implementing the above concepts in a node of a communication network, e.g., in a central node such as the central node 200. If a processor based implementation of the node is used, the steps of the method may be performed by one or more processors of the UE. For this purpose, the processor(s) may execute correspondingly configured program code. Further, at least some of the corresponding functionalities may be hardwired in the processor(s).

As mentioned above, the method is based on maintaining a hash-based sketch at the node. The node may initially determine the sketch, e.g., in accordance with configuration information from an OSS of the communication network, such as the OSS 300. The sketch summarizes a number of occurrence of an event for a group of UEs, e.g., the UEs 10. The sketch may for example correspond to a CM sketch. As mentioned above, the event may for example correspond to sending or receiving of a data item, e.g., a data packet or a certain traffic volume, setting up a connection, releasing a connection, dropping of a data packet, usage of an application or service, usage of bearers or parameters associated with a bearer, or the like. The event may also correspond to one of the above actions occurring in a given time bin.

At step 310, the node may receive further a hash-based sketch from at least one further node of the communication network, e.g., from one or more of local nodes distributed in the communication network, such as the local nodes 100-1, 100-2, 100-3. In particular, the further sketch may be received from a plurality of further nodes. Similar to the above sketch, the further sketch summarizes the number of occurrence of an event for a group of UEs, e.g., the UEs 10, and may for example correspond to a CM sketch. However, the further sketch may include updated information concerning the number of occurrence of the event, e.g., as obtained from measurements performed by the at least one further node.

At step 320, the node may obtain occurrence data for the group of UEs. In particular, the occurrence data may be received from a plurality of further nodes. Step 320 may be used by the node as an alternative or in addition to step 310 for receiving information representing the number of occurrence of the event for the group of UEs from the at least one further node. The occurrence data may for example indicate the number of occurrence of the event for one or more of the UEs of the group, e.g., in terms of a counter value.

At step 330, the node updates the sketch with said information received from the at least one further node in step 310 or 320. This may be accomplished by merging the sketch received at step 310 to the sketch maintained by the node or by encoding the number of occurrence for the specific UE received at step 320 into the sketch, e.g., using relation (1). For encoding the number of occurrence into the sketch, an identifier of the specific UE may be used as a key. For example, such identifier may correspond to an IMSI, a TMSI, an IMEI, and/or a URI.

At step 340, the node provides the updated sketch to the at least one further node. In particular, the updated sketch may be provided to a plurality of further nodes, thereby allowing to maintain up-to date information concerning the number of occurrence of the event at multiple nodes.

Further, as indicated by step 350, the node may use the updated sketch as a basis for controlling communication of one or more of the UEs. As mentioned above, this may involve optimizing performance for these one or more UEs, e.g., by adjusting a radio access parameter, or prioritizing the UE or a service used by the UE, by controlling RAB parameters as for example explained above.

Further, as indicated by step 360, the node may use the updated sketch as a basis for providing information to an OSS of the communication network, e.g., to the OSS 300, or to some other node of the communication network. For this purpose, the node may be provided with a corresponding interface to the OSS or other node.

Figure 4:
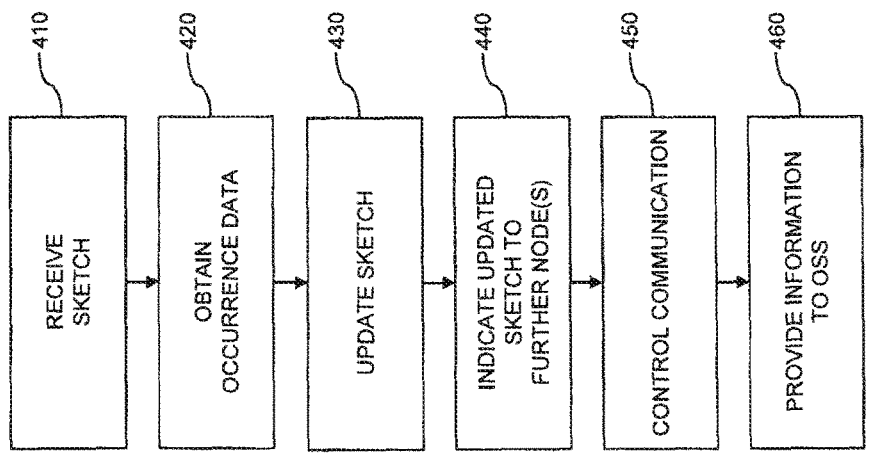
FIG. 4 shows a flowchart for illustrating a method according to an embodiment of the invention, which may be implemented by a local node which exchanges sketches with a central node.

FIG. 4 shows a flowchart for illustrating a method which may be used for implementing the above concepts in a node of a communication network, e.g., in a local node such as the one of the local nodes 100-1, 100-2, 100-3. If a processor based implementation of the node is used, the steps of the method may be performed by one or more processors of the UE. For this purpose, the processor(s) may execute correspondingly configured program code. Further, at least some of the corresponding functionalities may be hardwired in the processor(s).

At step 410, the node receives a hash-based sketch from a further node of the communication network, e.g., from a central node such as the central node 200. As illustrated in FIG. 1, the further node may be interfaced to other nodes of the communication network which have similar functionalities as the node and are distributed in the communication network. The sketch summarizes the number of occurrence of an event for a group of UEs, e.g., the UEs 10, and may for example correspond to a CM sketch. As mentioned above, the event may for example correspond to sending or receiving of a data item, e.g., a data packet or a certain traffic volume, setting up a connection, releasing a connection, dropping of a data packet, usage of an application or service, usage of bearers or parameters associated with a bearer, or the like. The event may also correspond to one of the above actions occurring in a given time bin.

At step 420, the node obtains occurrence data for a specific UE from the group. The occurrence data may for example indicate the number of occurrence of the event for one or more of the UEs of the group, e.g., in terms of a counter value. The node may obtain the occurrence data by detecting occurrence of event and updating a corresponding counter accordingly. Alternatively or in addition, the node could also receive indications of detections of the event and/or corresponding counter values from other nodes.

At step 430, the node updates the sketch with the occurrence data obtained at step 420. This may be accomplished by encoding the number of occurrence into the sketch, e.g., using relation (1). For encoding the number of occurrence into the sketch, an identifier of the specific UE may be used as a key. For example, such identifier may correspond to an IMSI, a TMSI, an IMEI, and/or a URI.

At step 440, the node provides the updated sketch to the further node, thereby providing the further node with up-to date information concerning the number of occurrence of the event as observed at the node. The further node may then propagate this information to other nodes of the communication network, e.g., using a procedure according to the method of FIG. 3.

Further, as indicated by step 450, the node may use the updated sketch as a basis for controlling communication of one or more of the UEs. As mentioned above, this may involve optimizing performance for these one or more UEs, e.g., by adjusting a radio access parameter, or prioritizing the UE or a service used by the UE, by controlling RAB parameters as for example explained above.

Further, as indicated by step 460, the node may use the updated sketch as a basis for providing information to an OSS of the communication network, e.g., to the OSS 300, or to some other node of the communication network. For this purpose, the node may be provided with a corresponding interface to the OSS or other node.

It is to be understood that the methods of FIGS. 3 and 4 may also be used in combination in a system which includes a node operating according to the method of FIG. 3 and one or more further nodes operating according to the method of FIG. 4.

Figure 5:
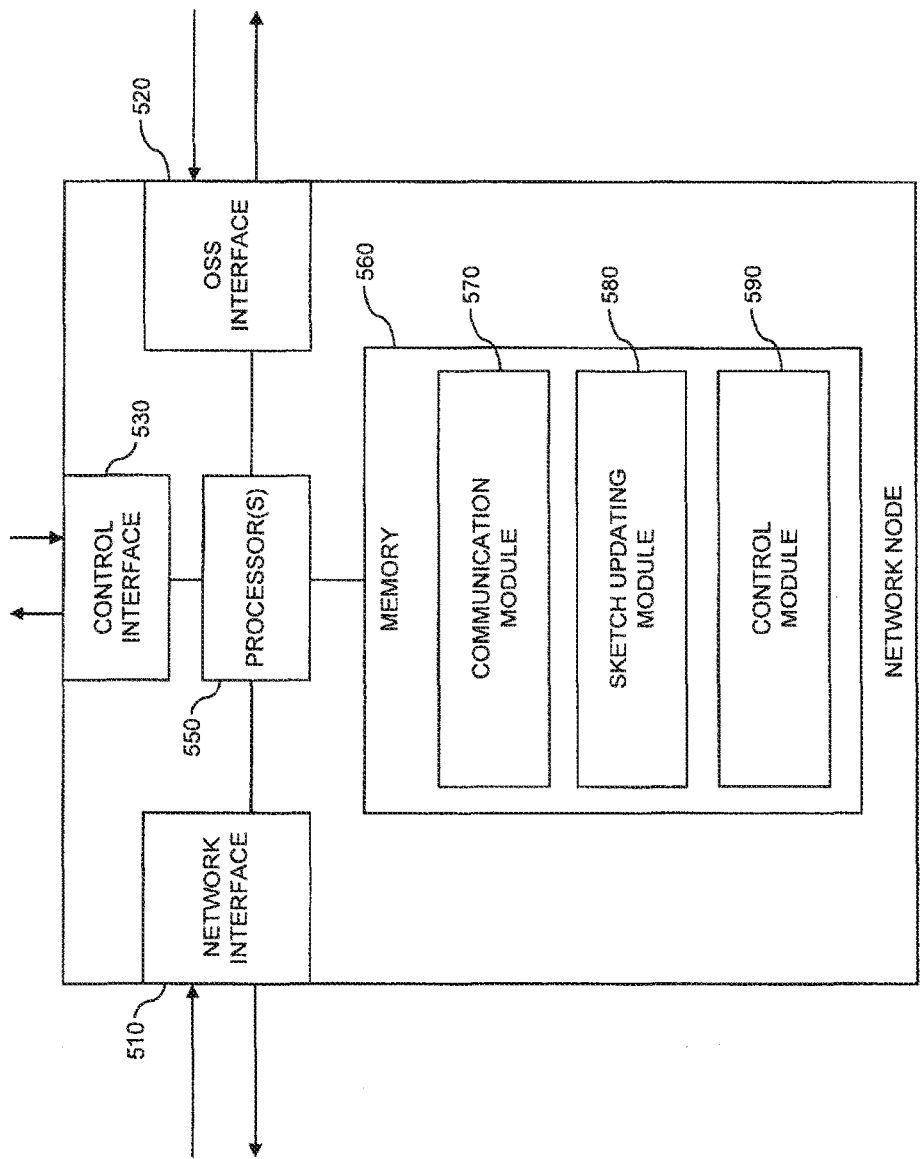
FIG. 5 schematically illustrates structures of a central node according to an embodiment of the invention.

FIG. 5 illustrates an exemplary implementation of a node which may be used to implement the above concepts. For example, the illustrated structures may be used to implement the above-described functionalities of the central node 200.

In the illustrated example, the node includes a network interface 510, which may be used for communication with one or more further nodes of the communication network, such as the local nodes 100-1, 100-2, 100-3. For example, the network interface 510 may be used for sending and receiving sketches, as explained for the interfaces IF1 and IF2 in FIG. 1. In addition, the node may include an OSS interface 520 for communication with an OSS of the communication network, e.g., the OSS 300. The OSS interface 520 may for example be used by the node for sending information from sketches to the OSS, as explained for the interface IF3 of FIG. 1. Further, the node may include a control interface 530. The control interface 530 may for example be used for controlling communication of one or more UEs, e.g., by sending control messages.

Further, the node includes one or more processor(s) 550 coupled to the interfaces 510, 520, 530 and a memory 560 coupled to the processor(s) 550. The memory 560 may include a read-only memory (ROM), e.g., a flash ROM, a RAM, e.g., a dynamic RAM (DRAM) or static RAM (SRAM), a mass storage, e.g., a hard disk or solid state disk, or the like. The memory 560 includes suitably configured program code modules to be executed by the processor(s) 550 so as to implement the above-described functionalities of the central node, as for example generally outlined by the method of FIG. 3. More specifically, the program code modules in the memory 560 may include a communication module 570 so as to implement the above-described functionalities for sending and receiving sketches, for receiving occurrence data, or for sending information to the OSS. Further, the program code modules in the memory 560 may include a sketch updating module 580 so as to implement the above-mentioned functionalities of updating the sketch, e.g., by merging the sketch with a further sketch or encoding occurrence data for a specific UE into the sketch. Still further, the memory 560 may include control module 590 so as to implement generic control functionalities of the node, such as control of the interfaces 510, 520, 530, but also specific sketch based control functionalities as explained above.

It is to be understood that the structure as illustrated in FIG. 5 is merely schematic and that the node may actually include further components which, for the sake of clarity, have not been illustrated, e.g., further interfaces or further processors. Also, it is to be understood that the memory 560 may include further types of program code modules, which have not been illustrated, e.g., program code modules for implementing known statistical evaluation functionalities or monitoring functionalities. In some implementations, also a computer program may be provided for implementing functionalities of the node, e.g., in the form of a physical medium storing the program code modules to be stored in the memory 560 or by making such program code available for download.

Figure 6:
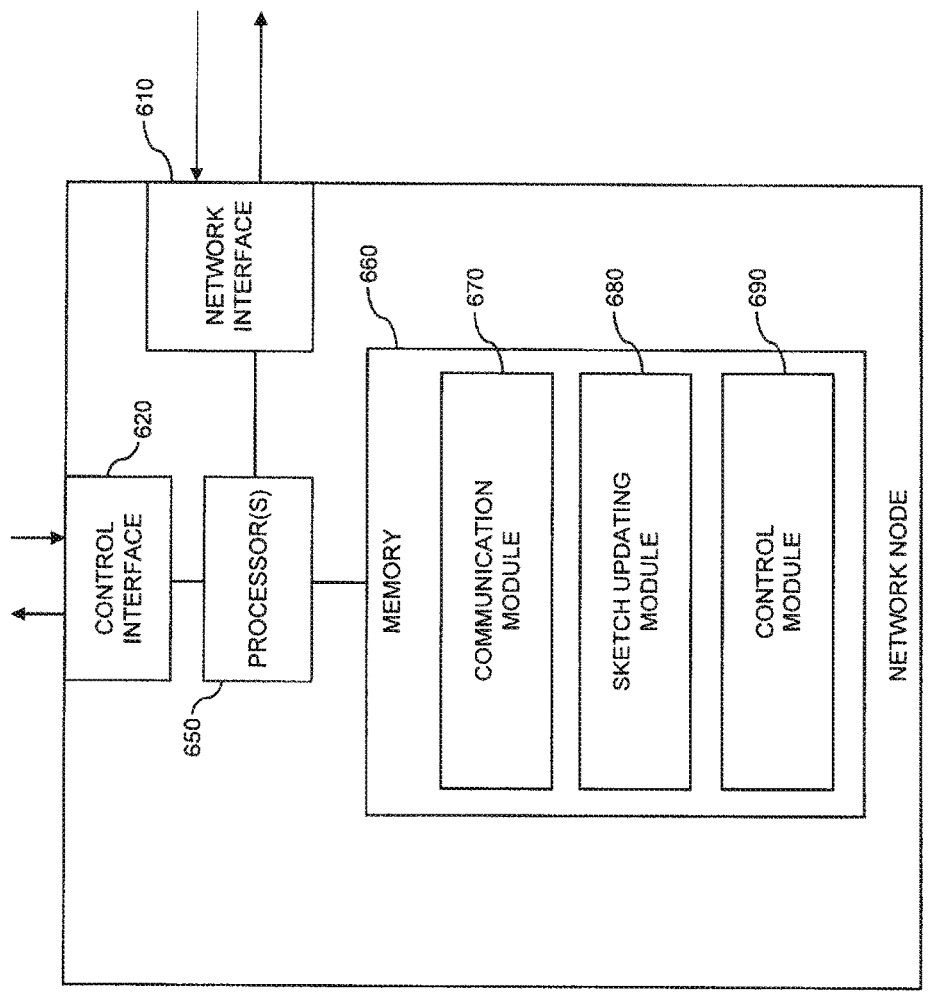
FIG. 6 schematically illustrates structures of a local node according to an embodiment of the invention.

FIG. 6 illustrates an exemplary implementation of a node which may be used to implement the above concepts. For example, the illustrated structures may be used to implement the above-described functionalities of one of the local nodes 100-1, 100-2, 100-3.

In the illustrated example, the node includes a network interface 610, which may be used for communication with a further node of the communication network, such as the central node 200. For example, the network interface 610 may be used for sending and receiving sketches, as explained for the interfaces IF1 and IF2 in FIG. 1. In addition, the node may include a control interface 620. The control interface 620 may for example be used for controlling communication of one or more UEs, e.g., by sending control messages. If the node implements functionalities of a base station, such as illustrated in the exemplary scenario of FIG. 1, the control interface 620 may also correspond to a radio interface.

Further, the node includes one or more processor(s) 650 coupled to the interfaces 610, 620 and a memory 660 coupled to the processor(s) 650. The memory 660 may include a ROM, e.g., a flash ROM, a RAM, e.g., a DRAM or SRAM, a mass storage, e.g., a hard disk or solid state disk, or the like. The memory 660 includes suitably configured program code modules to be executed by the processor(s) 650 so as to implement the above-described functionalities of the central node, as for example generally outlined by the method of FIG. 4. More specifically, the program code modules in the memory 660 may include a communication module 670 so as to implement the above-described functionalities for sending and receiving sketches, or for obtaining or sending occurrence data. Further, the program code modules in the memory 660 may include a sketch updating module 680 so as to implement the above-mentioned functionalities of updating the sketch, e.g., encoding occurrence data for a specific UE into the sketch. Still further, the memory 660 may include control module 690 so as to implement generic control functionalities of the node, such as control of the interfaces 610, 620, but also specific sketch based control functionalities as explained above.

It is to be understood that the structure as illustrated in FIG. 6 is merely schematic and that the node may actually include further components which, for the sake of clarity, have not been illustrated, e.g., further interfaces or further processors. Also, it is to be understood that the memory 660 may include further types of program code modules, which have not been illustrated, e.g., program code modules for implementing known statistical evaluation functionalities or monitoring functionalities. In some implementations, also a computer program may be provided for implementing functionalities of the node, e.g., in the form of a physical medium storing the program code modules to be stored in the memory 660 or by making such program code available for download.

As can be seen, the concepts as described above may be used for efficiently monitoring a communication network with respect to the number of occurrence of an event. As explained above, this may be accomplished for a group of UEs, and the collected information can be made available at a plurality of nodes of the communication network. In this way, the collected information may be used as a basis for short term control operations at the different nodes. Further, the sketches may be used as a basis for providing information to be used for purposes of managing or optimizing the communication network.

It is to be understood that the examples and embodiments as explained above are merely illustrative and susceptible to various modifications. For example, the concepts could be used in connection with various types of communication networks without limitation to the examples of communication networks mentioned herein. Moreover, it is to be understood that the above concepts may be implemented by using correspondingly designed software to be executed by one or more processors of an existing device, or by using dedicated device hardware. Also, the network anomaly analyzer as described herein may be implemented by a single device or by multiple devices, e.g., a device cloud or system of cooperating devices.

The invention claimed is:

1. A method for monitoring a communication network, the method comprising:
   a first node of the communication network determining a hash-based sketch summarizing a number of occurrence of an event for a group of user equipments (UEs);
   the first node receiving information representing the number of occurrence of the event for said group of user equipments from a second node of the communication network;
   the first node updating the hash-based sketch with said information received from the second node;
   the first node providing the updated hash-based sketch to the at least one further node; and
   generating a statistic on a UE level for a specific UE based on the updated hash-based sketch;
   wherein the determining of hash-based sketch comprises:
      obtaining a matrix having a first row comprising a first plurality of cells and a second row comprising a second plurality of cells, wherein a first hash function is associated with the first row and a second hash function is associated with the second row; and
      for a specific UE from said group of UEs, utilizing the first hash function and an identifier unique to the specific UE to select a first cell from said first plurality of cells, storing a first counter value in the selected first cell, utilizing the second hash function and the identifier unique to the specific UE to select a second cell from said second plurality of cell, and storing a second counter value in the selected cell.

2. The method according to claim 1, wherein
   the information received from the second node comprises a further hash-based sketch summarizing the number of occurrence of the event for said group of user equipments, and
   the first node updates the sketch by merging the further hash-based sketch to the hash-based sketch.

3. The method according to claim 1, wherein
   said information received from the second node comprises occurrence data of a specific UE from said group of UEs, the occurrence data indicating the number of occurrence of the event for the specific UE, and
   the first node updates the hash-based sketch by encoding the occurrence data into the hash-based sketch, using an identifier of the specific UE as a key.

4. The method according to claim 3, wherein the identifier of the specific UE comprises an International Mobile Subscriber Identity, a Temporary Mobile Subscriber Identity, an International Mobile Equipment Identity, and/or a Uniform Resource identifier.

5. A method for monitoring a communication network, the method comprising:
   a first node of the communication network receiving, from a second node of the communication network, a hash-based sketch summarizing the number of occurrences of an event for a group of user equipments (UEs);
   the first node obtaining occurrence data for a specific UE from said group of UEs, the occurrence data indicating the number of occurrences of the event for the specific UE; wherein the first node updates the hash-based sketch by encoding the occurrence data into the hash-based sketch, using an identifier of the specific UE as a key;
   the first node updating the hash-based sketch with said obtained occurrence data;
   the first node indicating the updated hash-based sketch to the second node; and
   generating a statistic on a UE level for a specific UE based on the updated hash-based sketch,
   wherein the determining of hash-based sketch comprises:
   obtaining a matrix having a first row comprising a first plurality of cells and a second row comprising a second plurality of cells, wherein a first hash function is associated with the first row and a second hash function is associated with the second row; and
   for a specific UE from said group of UEs, utilizing the first hash function and an identifier unique to the specific UE to select a first cell from said first plurality of cells, storing a first counter value in the selected first cell, utilizing the second hash function and the identifier unique to the specific UE to select a second cell from said second plurality of cell, and storing a second counter value in the selected cell.

6. The method according to claim 5,
   wherein the identifier of the specific UE comprises an International Mobile Subscriber Identity, a Temporary Mobile Subscriber Identity, an International Mobile Equipment Identity, and/or a Uniform Resource Identifier.

7. The method according to claim 5, further comprising:
   based on the updated hash-based sketch, the first node controlling communication of at least one UE from said group of UEs.

8. The method according to claim 5, further comprising:
   based on the updated hash-based sketch, the first node providing information to an operations support system of the communication network.

9. The method according to claim 5, wherein the hash-based sketch is a Count-MM Sketch.

10. A first node for a communication network, the first node comprising:
    an interface to a second node of the communication network; and
    one or more processors, wherein one or more of the one or more processors are configured to:
       obtain occurrence data for a specific user equipment (UE) from a group of UEs, the occurrence data indicating the number of occurrences of the event for the specific UE,
       update a hash-based sketch, which was transmitted by the second node, summarizing a number of occurrences of an event for a group of UEs using said obtained occurrence data,
       indicate the updated hash-based sketch to the second node,
       generate a statistic on a UE level for a specific UE based on the updated hash-based sketch; and
       determine hash-based sketch, wherein to determine the hash-based sketch comprises:
          to obtain a matrix having a first row comprising a first plurality of cells and a second row comprising a second plurality of cells, wherein a first hash function is associated with the first row and a second hash function is associated with the second row; and for a specific UE from said group of UEs, to utilize the first hash function and an identifier unique to the specific UE to select a first cell from said first plurality of cells, to store a first counter value in the selected first cell, to utilize the second hash function and the identifier unique to the specific UE to select a second cell from said second plurality of cell, and to store a second counter value in the selected cell.

11. A computer program product comprising a non-transitory computer readable medium storing a computer program comprising program code to be executed by at least one processor of a node for a communication network, wherein execution of the program code by the at least one processor causes the node to perform the method according to claim 1.

12. The method according to claim 1, wherein updating the hash-based sketch comprises:
increasing the first counter value and the second counter value by one for each newly detected occurrence of the event for the specific UE.

13. The method according to claim 1, wherein updating hash-based sketch comprises:
incrementing the first cell and the second cell according to:
$M[i, h_i(x)] := M[i, h_i(x)]+1$, with $i=0,1,\ldots,d$, for each newly detected occurrence of the event for the specific UE, wherein M represents the matrix comprising d rows, each row i having a hash function $h_i$, and x represents the specific UE.

14. A method for monitoring a communication network, the method comprising:
a first node of the communication network determining a hash-based sketch summarizing a number of occurrence of an event for a group of user equipments (UEs);
the first node receiving information representing the number of occurrence of the event for said group of user equipments from a second node of the communication network;
the first node updating the hash-based sketch with said information received from the second node;
the node providing the updated sketch to the at least one further node;
generating a statistic on a UE level for a specific UE based on the updated hash-based sketch,
wherein the hash-based sketch (HBS) is a matrix comprising a plurality of rows,
the plurality of rows comprises a first row and a second row,
the first row comprises a first plurality of cells,
the second row comprises a second plurality of cells,
the step of updating the HBS comprises:
selecting a first cell from the first plurality of cells based on a hash value computed using a first hash function associated with the first row and a UE identifier identifying one of said UEs included in the group of UEs;
selecting a second cell from the second plurality of cells based on a hash value computed using a second hash function associated with the second row and the UE identifier;
storing a first updated counter value in said cell selected from the first plurality of cells; and
storing a second updated counter value in said cell selected from the second plurality of cells.

15. The method of claim 14, wherein the step of updating the HBS further comprises:
obtaining a first stored counter value from said cell selected from the first plurality of cells;
calculating the first updated counter value using the obtained first stored counter value;
obtaining a second stored counter value from said cell selected from the second plurality of cells; and
calculating the second updated counter value using the obtained second stored counter value.

* * * * *